United States Patent [19]

Döring et al.

[11] Patent Number: 6,111,002
[45] Date of Patent: Aug. 29, 2000

[54] FLAME-RETARDANT DISPERSION COMPOSITION

[75] Inventors: Wolfgang Döring, München; Jürgen Stohrer, Pullach; Richard Goetze, Burghausen, all of Germany

[73] Assignee: Wacker-Chemie GmbH, Munich, Germany

[21] Appl. No.: 09/353,692

[22] Filed: Jul. 14, 1999

[30] Foreign Application Priority Data

Jul. 16, 1998 [DE] Germany ............ 198 32 094

[51] Int. Cl.⁷ .................. C08K 3/32; C08K 3/34
[52] U.S. Cl. ............ 524/262; 524/506; 524/563; 524/145; 524/501; 524/266; 556/405
[58] Field of Search ........... 524/501, 506, 524/563, 145, 262, 266, 832, 836, 845; 556/405

[56] References Cited

U.S. PATENT DOCUMENTS

| | | | |
|---|---|---|---|
| 3,699,188 | 10/1972 | Kodama et al. | 524/119 |
| 3,760,037 | 9/1973 | Yoshizawa et al. | 558/103 |
| 5,169,888 | 12/1992 | Sales | 524/267 |
| 5,412,014 | 5/1995 | Romenesko | 524/416 |
| 5,622,778 | 4/1997 | Horii et al. | 442/118 |
| 5,749,948 | 5/1998 | Scholz et al. | 106/18.15 |

FOREIGN PATENT DOCUMENTS

| | | |
|---|---|---|
| 0 733 638 A1 | 9/1996 | European Pat. Off. . |
| 38 03 030 C2 | 4/1995 | Germany . |
| 195 08 530 A1 | 9/1996 | Germany . |

OTHER PUBLICATIONS

Derwent Abstract corr. to DE 3803030 (AN 1989–229137).
Derwent Abstract corr. to DE 19508530 (AN 1996–413481).
Noll, Chemistry and Technology of the Silicones, 2nd Edition, 1968, Weinheim.
Houben–Weyl, Methods in Organic Chemistry, vol. E 20, pp. 1782 et seq. & 2219 et seq., G. Thieme Verlag, Stuttgart, 1987.
Houben–Weyl, Methods in Organic Chemistry, vol. XIV, Macro Molecular Materials, G. Thieme Verlag, Stuttgart, 1961, pp. 192–208.
Caplus 1977:535546 Carbonfunctional organosilicon compounds substituted in the alpha–position. II. Phosphorus––containing oranosilicon compounds, Chem. Prum. (1977), 27(5), 234–7, Dvorak et al., 1977.

*Primary Examiner*—Robert Dawson
*Assistant Examiner*—Kuo-Liang Peng
*Attorney, Agent, or Firm*—Brooks & Kushman P.C.

[57] ABSTRACT

The preparation of an aqueous dispersion can be based on at least one water-insoluble organopolymer, on at least one water-dispersible silicon compound and on at least one water-soluble or dispersible phosphorus compound.

16 Claims, No Drawings

FLAME-RETARDANT DISPERSION COMPOSITION

TECHNICAL FIELD

The invention relates to an aqueous dispersion, to its preparation and use, and to products comprising the same.

BACKGROUND ART

It is known that polymers can be rendered flame-retardant using halogen-containing additives or comonomers, where appropriate, combined with antimony compounds. Flame retardants based on metal hydroxides, such as $Al(OH)_3$ or $Mg(OH)_2$, are generally insufficiently active and/or impair the mechanical properties of the polymer because the amount used is high. Phosphorus-containing flame retardants, e.g. ammonium polyphosphate, used alone, also has relatively low activity per se, compared with halogen compounds.

Particular requirements are placed on flame retardants for aqueous polymer dispersions: they must be water-soluble or water-dispersible, and the dispersion in which the flame retardant is present must be stable, i.e. there must be no flocculation or coagulation, and the flame retardant must be stable in, and homogeneously distributed in, films prepared from the dispersion.

DE 3803030 C2 describes the use of phosphonates as flame retardants in plastics, such as polyurethane, polyvinyl chloride, polyester and epoxy resin.

EP 0733638 A1 describes phosphorus-containing aromatic dicarboxylic esters as halogen-free flame retardants for polyester fiber materials.

DE-A 19508530 describes the simultaneous use of functionalized monomers and phosphorus compounds reactive with these functional groups to improve flame retardancy in aqueous dispersion compositions.

U.S. Pat. No. 5,412,014 A describes a process for rendering thermoplastics or heat-curable resins flame-retardant using a mixture of a silicone polymer powder composed of a polydiorganosiloxane and silica, together with a phosphorus-containing flame retardant.

DISCLOSURE OF INVENTION

The object of the invention is to improve upon the flame retardant compositions of the prior art, and in particular, to provide aqueous dispersion compositions which during subsequent use, e.g. as coating or impregnating compositions, have sufficient flame-retardant action without the use of halogen compounds or antimony compounds. A further object of the invention is to provide aqueous dispersion compositions which are suitable both for consolidating fibrous materials and pads, as well as for textile finishing.

DETAILED DESCRIPTION OF THE INVENTION

The invention provides aqueous dispersions which can be prepared from at least one water-insoluble organopolymer, at least one water-dispersible silicon compound, and at least one water-soluble or dispersible phosphorus compound.

Preferred suitable water-insoluble organopolymers are homo- and copolymers which are in the form of an aqueous dispersion and which, where appropriate at elevated temperature and/or in an alkaline medium, form a solid film after drying and, where appropriate, after crosslinking.

Preferred water-insoluble polymers are vinyl ester homo- or copolymers containing one or more monomer units selected from the class consisting of the vinyl esters of unbranched or branched alkylcarboxylic acids, preferably those having from 1 to 15 carbon atoms, and more preferably those having from 1 to 10 carbon atoms, and in particular from 1 to 3 carbon atoms; (meth)acrylate homopolymers or (meth)acrylate copolymers containing one or more monomer units selected from the class consisting of the methacrylates and acrylates of unbranched or branched alcohols having from 1 to 12 carbon atoms, more preferably from 1 to 8 carbon atoms, and particularly preferably, from 1 to 4 carbon atoms; homo- or copolymers of fumaric and/or maleic mono- or diesters of unbranched or branched alcohols having from 1 to 12 carbon atoms, more preferably from 1 to 8 carbon atoms, and particularly from 1 to 4 carbon atoms; homo- or copolymers of dienes, such as butadiene or isoprene, or also of olefins, such as ethene or propene, where the dienes may be copolymerized with other unsaturated monomers, for example, styrene, (meth)acrylates, or the esters of fumaric or maleic acid; and homo- or copolymers of vinyl aromatics, such as styrene, methylstyrene or vinyltoluene.

Polymers also suitable, where appropriate, are water-insoluble, film-forming polyaddition or polycondensation polymers, such as polyurethanes, polyesters, polyethers (except polyoxyethylene polymers), polyamides, melamine-formaldehyde resins and phenol-formaldehyde resins, where appropriate also in the form of their oligomeric precursors.

Preferred vinyl esters are vinyl acetate, vinyl propionate, vinyl butyrate, vinyl 2-ethylhexanoate, vinyl laurate, 1-methylvinyl acetate, vinyl pivalate and vinyl esters of α-branched monocarboxylic acids having up to 15 carbon atoms, more preferably from 1 to 10 carbon atoms, for example VeoVa9®—vinyl neononanoate or VeoVa10®—vinyl neodecanoate. Particular preference is given to vinyl esters with a high ratio of O to CH, for example vinyl acetate.

Preferred methacrylates and acrylates are methyl acrylate, methyl methacrylate, ethyl acrylate, ethyl methacrylate, propyl acrylate, propyl methacrylate, n-butyl acrylate, tert-butyl acrylate, n-butyl methacrylate, tert-butyl methacrylate and 2-ethylhexyl acrylate. Particular preference is given to methyl acrylate, methyl methacrylate, n-butyl acrylate and 2-ethylhexyl acrylate. Particularly preferred methacrylates and acrylates are those with a high ratio of O to CH, for example methyl acrylate and methyl methacrylate.

Preferred ester groups of fumaric and maleic acid are methyl, ethyl, n-propyl, isopropyl, n-butyl, isobutyl, tert-butyl, hexyl, ethylhexyl and dodecyl. Particularly preferred fumaric and maleic esters are those with a high ratio of O to CH, for example dimethyl fumarate and dimethyl maleate.

The vinyl ester copolymers may, where appropriate, comprise from 1.0 to 65% by weight, based on the total weight of the comonomer phase, of preferably α-olefins, such as ethylene or propylene and/or vinylaromatics, such as styrene, and/or acrylates or, respectively, methacrylates of alcohols having from 1 to 15 carbon atoms, for example, methyl acrylate, methyl methacrylate, ethyl acrylate, ethyl methacrylate, propyl acrylate, propyl methacrylate, n-butylacrylate, tert-butyl acrylate, n-butyl methacrylate, tert-butyl methacrylate or 2-ethylhexyl acrylate, and/or ethylenically unsaturated dicarboxylic esters and/or derivatives of these, for example diisopropyl fumarate or the dimethyl, methyl tert-butyl, di-n-butyl, di-tert-butyl or diethyl esters of maleic acid or of fumaric acid, or maleic anhydride. Particular preference is given to acrylates and methacrylates of alcohols having from 1 to 8 carbon atoms, very particularly preferably having from 1 to 4 carbon atoms, for example methyl acrylate, methyl methacrylate, ethyl acrylate, ethyl methacrylate, propyl acrylate, propyl methacrylate, n-butyl acrylate, tert-butyl acrylate, n-butyl methacrylate and tert-butyl methacrylate.

The vinyl ester copolymers preferably comprise less than 20% by weight, based on the total weight of the comonomer phase, of α-olefins and/or vinyl aromatics and/or acrylates or, respectively, methacrylates of alcohols having more than 4 carbon atoms and/or ethylenically unsaturated dicarboxylic esters of alcohols having more than 4 carbon atoms, resulting in a low ratio of O to CH in the copolymer.

The (meth)acrylate copolymers may, where appropriate, comprise from 1.0 to 65% by weight, based on the total weight of the comonomer phase, of preferably α-olefins, such as ethylene or propylene, and/or vinyl aromatics, such as styrene, and/or ethylenically unsaturated dicarboxylic esters or derivatives of these, such as diisopropyl fumarate, the dimethyl, methyl tert-butyl, dibutyl or diethyl esters of maleic acid or of fumaric acid, or maleic anhydride.

In a preferred embodiment the vinyl ester copolymers and the (meth)acrylate copolymers preferably also comprise from 0.05 to 10.0% by weight, based on the total weight of the comonomer mixture, of comonomers selected from the class of ethylenically unsaturated carboxylic acids, preferably acrylic or methacrylic acid; selected from the class of the ethylenically unsaturated carboxamides, preferably acrylamide; selected from the class of the ethylenically unsaturated sulfonic acids and salts thereof, preferably vinyl sulfonic acid; and/or selected from the class of comonomers with more than one ethylenic unsaturation, for example divinyl adipate, diallyl maleate, allyl methacrylate or triallyl cyanurate. Other suitable comonomers are crosslinking comonomers, such as acrylamidoglycolic acid (AGA), methyl methylacrylamidoglycolate (MAGME), N-methylolacrylamide (NMAA), N-methylolmethacrylamide, N-methylolallyl carbamate, alkyl ethers, such as isobutoxy ether, or esters of N-methylolacrylamide, of N-methylolmethacrylamide or of N-methylolallyl carbamate.

This discussion above relating to the vinyl ester copolymers and the (meth)acrylate copolymers applies correspondingly to the copolymers of the maleic or fumaric esters.

The free-radical polymerizable, water-insoluble polymers mentioned are preferably prepared by emulsion polymerization. The polymerization may be carried out batchwise or continuously, with or without the use of seed latices. Some or all of the constituents of the reaction mixture may be within the initial charge, or these may be partly within the initial charge and partly in the feed, or the feed process may be used with no initial charge. All of the feeds preferably correspond to the amount of the respective component consumed. The polymerization is preferably carried out within a temperature range from 0° to 100° C., particularly preferably from 20° to 100° C., very particularly preferably from 30° to 90° C., and is initiated using the methods usually used for emulsion polymerization. The usual water-soluble free-radical generators are used for initiation, preferably in amounts of from 0.01 to 3.0% by weight, based on the total weight of the monomers. Dispersing agents which may be used are any of the emulsifiers and/or protective colloids usually used in emulsion polymerization.

The amount of emulsifier used is up to 6% by weight, where appropriate, based on the total weight of the monomers in the emulsion polymerization. Preferred emulsifiers here are either anionic, cationic or nonionic emulsifiers insoluble in the protective colloid. Preference is given to the use of protective colloids, particularly preferably in amounts of up to 15% by weight, based on the total weight of the monomers. Examples of these are preferably polyvinyl alcohols and their derivatives, such as vinyl alcohol-vinyl acetate copolymers, polyvinylpyrrolidones; polysaccharides in water-soluble form, such as starches (amylose and amylopectin), cellulose, guar, tragacanthic acid, dextran, alginates and their carboxymethyl, methyl, hydroxyethyl and hydroxypropyl derivatives; proteins, such as casein, soy protein, gelatin; synthetic polymers, such as poly(meth)acrylic acid, poly(meth)acrylamide, polyvinylsulfonic acids and water-soluble copolymers of these; melamine-formaldehyde sulfonates, naphthalene-formaldehyde sulfonates, and styrene-maleic acid and vinyl ether-maleic acid copolymers.

The amount of the organopolymers present is preferably from 30 to 70% by weight, particularly preferably from 40 to 60% by weight, very particularly preferably from 40 to 55% by weight, based on the total weight of the aqueous dispersion.

Suitable water-dispersible silicon compounds are preferably silicates $Si(OR')_4$, organoorganoxysilanes $SiR_n(OR')_{4-n}$, with n=from 1 to 3, oligosiloxanes of the general formula $R_3SiO(SiR_2O)_nSiR_3$ with n=from 0 to 4, or the products of hydrolysis and condensation of these, where each R' is an identical or different alkyl radical or alkoxyalkylene radical having from 1 to 4 carbon atoms, preferably methyl or ethyl, and each R is identical or different and is a branched or unbranched alkyl radical having preferably from 1 to 22 carbon atoms, more preferably from 1 to 10 carbon atoms, and particularly, from 1 to 4 carbon atoms, cycloalkyl radicals having preferably from 3 to 10 carbon atoms, more preferably from 5 to 6 carbon atoms, and particularly, 6 carbon atoms, alkylene radicals having preferably from 2 to 4 carbon atoms, aryl, aralkyl or alkaryl radicals having preferably from 6 to 18 carbon atoms, more preferably from 6 to 12 carbon atoms, and particularly, from 6 to 8 carbon atoms, where the radicals R mentioned may also be substituted by ether groups, thioether groups, ester groups, amide groups, nitrile groups, hydroxyl groups, amine groups, carboxyl groups, sulfonic acid groups, carboxylic anhydride groups or carbonyl groups.

Examples of particularly preferred silicon compounds are tetraethoxysilane, methyltri-(m)ethoxysilane, methyltripropoxysilane, methyltri(ethoxyethoxy)silane, vinyltri(methoxyethoxy)silane, (meth)acryloxypropyltriethoxy or -trimethoxysilane, β-nitriloethyltriethoxysilane, mercaptopropyltriethoxy- or -trimethoxysilane, phenyltriethoxysilane, isooctyltriethoxysilane, dipropyldiethoxysilane, methylphenyldiethoxysilane, diphenyldimethoxysilane, methylvinyltri(ethoxyethoxy)silane, or also di- and/or trisiloxanes of these. Mention may also be made of hexamethyldiethoxytrisiloxane, octamethylcyclotetrasiloxane, tetramethyldiethoxydisilane, trimethyltrimethoxydisilane, dimethyltetramethoxydisilane and also pentamethyldisilanedisiloxane.

The silicon compounds mentioned are preferably used as such, or may be used in the form of their products of hydrolysis and condensation.

The silicon compounds mentioned may be used alone or in a mixture.

The organosilicon compounds may be prepared by processes as described in Noll, Chemie und Technologie der Silicone [Chemistry and Technology of the Silicones], 2nd Edition 1968, Weinheim, and in Houben-Weyl, Methoden der organischen Chemie [Methods in Organic Chemistry] Vol. E20, pp. 1782 et seq. and 2219 et seq. Georg Thieme Verlag, Stuttgart, 1987.

The amount of the water-dispersible organosilicon compounds present is preferably from 0.5 to 60% by weight, more preferably from 0.5 to 20% by weight, and most preferably from 0.5 to 10% by weight, based on the amount of organopolymer.

The silicon compounds are preferably added as an emulsion to the dispersed organopolymer. Emulsifiers which may be used here are either anionic, cationic, or nonionic emulsifiers. Suitable emulsifiers are well known to the skilled worker and may be found, for example, in Houben-Weyl, Methoden der organischen Chemie, Vol. XIV, 1, Makromolekulare Stoffe [Macromolecular Materials], Georg Thieme Verlag, Stuttgart, 1961, 192–208. Preferred examples of emulsifiers are anionic emulsifiers:

1. Alkyl sulfates, particularly those having a chain length of from 8 to 18 carbon atoms, alkyl- and alkaryl ether sulfates having from 8 to 18 carbon atoms in the hydrophobic radical and from 1 to 40 ethylene oxide (EO) or propylene oxide (PO) units.

2. Sulfonates, particularly alkylsulfonates having from 8 to 18 carbon atoms, alkylarylsulfonates having from 8 to 18 carbon atoms, taurides, esters and monoesters of sulfosuccinic acid with monohydric alcohols or with alkyl phenols having from 4 to 15 carbon atoms; where appropriate these alcohols or alkyl phenols may also have been ethoxylated using from 1 to 40 EO units.

3. Alkali metal salts and ammonium salts of carboxylic acids having from 8 to 20 carbon atoms in the alkyl, aryl, alkaryl or aralkyl radical.

4. Partial esters of phosphoric acid and the alkali metal salts and ammonium salts of these, particularly alkyl and alkaryl phosphates having from 8 to 20 carbon atoms in the organic radical, alkyl ether phosphates and alkaryl ether phosphates having from 8 to 20 carbon atoms in the alkyl or alkaryl radical, respectively, and from 1 to 40 EO units.

Preferred nonionic emulsifiers are:

5. Polyvinyl alcohol which also has from 5 to 50%, preferably from 8 to 20%, of vinyl acetate units, with a degree of polymerization of from 500 to 3000.

6. Alkyl polyglycol ethers, preferably those having from 8 to 40 EO units and having alkyl radicals of from 8 to 20 carbon atoms.

7. Alkylaryl polyglycol ethers, preferably those having from 8 to 40 EO units and from 8 to 20 carbon atoms in the alkyl and aryl radicals.

8. Ethylene oxide-propylene oxide (EO/PO) block copolymers, preferably those having from 8 to 40 EO or PO units.

9. Adducts of alkylamines having alkyl radicals of from 8 to 22 carbon atoms with ethylene oxide or propylene oxide.

10. Fatty acids having from 6 to 24 carbon atoms.

11. Alkyl polyglycosides of the general formula $R^*$—O—$Z_o$, where $R^*$ is a linear or branched, saturated or unsaturated alkyl radical having an average of from 8 to 24 carbon atoms and $Z_o$ is an oligoglycoside radical having an average of o=from 1 to 10 hexose or pentose units or mixtures of these.

12. Naturally occurring materials and derivatives of these, for example lecithin, lanolin, saponins, cellulose; cellulose alkyl ethers and carboxyalkylcelluloses whose alkyl groups have in each case up to 4 carbon atoms.

13. Linear organo(poly)siloxanes containing polar groups, in particular those with alkoxy groups having up to 24 carbon atoms and/or up to 40 EO and/or PO groups.

Preferred cationic emulsifiers are:

14. Salts of primary, secondary or tertiary fatty amines having from 8 to 24 carbon atoms with acetic acid, sulfuric acid, hydrochloric acid or phosphoric acids.

15. Quaternary alkyl- and alkylbenzeneammonium salts, in particular those whose alkyl group has from 6 to 24 carbon atoms, in particular the halides, sulfates, phosphates and acetates.

16. Alkylpyridinium, alkylimidazolinium and alkyloxazolinium salts, in particular those whose alkyl chain has up to 18 carbon atoms, specifically the halides, sulfates, phosphates and acetates.

Preferred ampholytic emulsifiers are:

17. Long-chain substituted amino acids, such as N-alkyl di(aminoethyl)glycine or salts of N-alkyl-2-aminopropionic acid.

18. Betaines, such as N-(3-acylamidopropyl)-N:N-dimethylammonium salts having a $C_8$–$C_{18}$-acyl radical and alkylimidazolium betaines.

In general the amount of the emulsifiers used is preferably up to 10% by weight, based on the silicon compounds. The amount is preferably <1% by weight, based on the organopolymers.

Suitable phosphorus compounds which are dispersible or soluble in water are preferably esters, amides or ester amides of alkyl- or arylphosphonic acids, of phosphoric acid or of pyrophosphoric acid, tetrakis(hydroxyalkyl)phosphonium salts, salts of polyphosphoric acid, in particular ammonium polyphosphate, or triarylor trialkylphosphine oxides.

Examples of preferred phosphorus compounds are diethyl methanephosphonate, dimethyl methanephosphonate and pentaerythritol di(m)ethyldiphosphonate, neopentyl (m)ethylphosphonate, triphenyl phosphate, tricresyl phosphate, resorcinol bis(diphenyl phosphate), pentraerythritol diphenyldiphosphate, neopentyl phenyl phosphate, mono-, di- and triammonium nitrilotrismethylenetriphosphonate, dimethyl 3-[(hydroxymethyl)amino]-3-oxopropylphosphonate, tetrakis(hydroxymethyl)phosphonium chloride, ammonium polyphosphate, tritolylphosphine oxide and triphenylphosphine oxide.

Particularly preferred phosphorus compounds are diethyl methanephosphonate, dimethyl methanephosphonate, mono-, di- and triammonium nitrilotrismethylenephosphonate and dimethyl 3-[(hydroxymethyl)amino]-3-oxopropylphosphonate.

The amounts of the phosphorus compounds used are preferably from 0.1 to 90% by weight, particularly preferably from 0.1 to 50% by weight, very particularly preferably from 5 to 30% by weight, based on the total weight of the organopolymers.

Other preferred phosphorus compounds are those which also have silicon in the molecule, for example diethyl 2-triethoxysilylethanephosphonate, diethyl 2-trimethoxysilylethanephosphonate, diethyl 3-trimethoxysilylpropanephosphonate, diethyl 2-tri(methoxyethoxy)silylethanephosphonate and 1,3-bis(diethylphosphonoethyl)tetramethyldisiloxane.

The amounts used of the phosphorus compounds with silicon in the molecule are preferably from 0.1 to 90% by weight, particularly preferably from 0.1 to 50% by weight, very particularly preferably from 5 to 30% by weight, based on the total weight of the organopolymers.

The phosphorus compounds are preferably added to the polymer dispersion as an aqueous solution or in the form of an emulsion. For the composition of such emulsions, the comments which relate to the silicon compounds is applicable to the phosphorus compounds as well. The phosphorus compounds mentioned may be used alone or in a mixture.

The invention also provides a process for preparing an aqueous dispersion, where the constituents are mixed with one another. In particular, an aqueous polymer dispersion, silicon compound and phosphorus compound are mixed with one another. The form in which the polymer dispersion constituent is used here is always that of an aqueous dispersion. The constituent which is the silicon component may be used undiluted or as an aqueous emulsion. The constituent which is the phosphorus component may be used undiluted or, if a solid, as an aqueous solution or dispersion or, if a liquid, as an aqueous solution or emulsion. Any combination of the formulations given above is possible.

A preferred process method is to mix an aqueous polymer dispersion with an aqueous solution of the phosphorus component and an emulsion of the silicon component. Another preferred process method is to mix an aqueous polymer dispersion with the undiluted phosphorus component and an emulsion of the silicon component.

The constituents which are the polymer dispersion, the silicon component and the phosphorus component are mixed with one another by stirring or shaking. The polymer dispersion is preferably an initial charge here and the silicon component and the phosphorus component are then added. The silicon component and the phosphorus component are preferably first mixed, and the mixture is then added to the polymer dispersion.

The novel dispersions are preferably used in coating compositions, impregnating compositions or adhesives. They are also used to consolidate fibrous materials or pads. The dispersion compositions may be used in the typical fields of application, for example in coating compositions and flame-retardant paints, in adhesives, or as binders for textiles, and are particularly suitable for consolidating fibrous materials, such as nonwovens or pads, and also for textile finishing.

The invention also provides fibrous materials in which the novel dispersions are present. The substrates treated with the novel dispersion composition are more flame-retardant than untreated substrates.

For textile treatment the novel dispersion is used at a dilution of preferably from 5 to 40% by weight in water. The dilution is matched to the particular treatment process. For example, for spraying it is from 10 to 25% by weight, for slop padding it is from 5 to 35% by weight and for foam application it is from 20 to 30% by weight.

EXAMPLES

Preparation of the emulsion solution:

0.50 g of Aerosol A 102 (salt of sulfosuccinic monoester) and 4.60 g of Genapol PF 40 (polymerization product of propylene oxide and ethylene oxide) were dissolved in 232 g of $H_2O$.

Preparation of the polymer films:

A doctor blade was used to draw a film of the dispersion on a level substrate to give a film thickness of about 250 $\mu$m after drying. After air-drying for about 20 h the polymer film was annealed for 5 min in a drying cabinet at 150° C. Sections measuring 140×52 mm were cut out of the film and stored in a desiccator for at least 24 h over "blue gel".

Oxygen index (LOI) determination:

The LOI was determined to ISO 4589, except that the specimens were stored over "blue gel" in a desiccator for at least 24 h prior to testing.

Example 1

4.22 g of methyltriethoxysilane and 2.94 g of dimethyl phosphonate (DMMP) were stirred into 15.8 g of the emulsion solution. The resulting emulsion was stirred into 200 g of a crosslinkable vinyl acetate-butyl acrylate dispersion (LT 420 from Wacker-Chemie GmbH) with a solids content of 48%, and mixed vigorously for 2 h.

The LOI of the resultant polymer film was 23.5.

Example 2

8.44 g of methyltriethoxysilane and 5.88 g of DMMP were stirred into 31.6 g of the emulsion solution. The resultant emulsion was stirred into 200 g of a crosslinkable vinyl acetate-butyl acrylate dispersion (LT 420 from Wacker-Chemie GmbH) with a solids content of 48%, and mixed vigorously for 2 h.

The LOI of the resultant polymer film was 24.2.

Example 3

7.8 g of Wacker SiP-ester (diethyl triethoxysilylethanephosphonate) were stirred into 15.8 g of the emulsion solution. The resultant emulsion was stirred into 200 g of a crosslinkable vinyl acetate-butyl acrylate dispersion (LT 420 from Wacker-Chemie GmbH) with a solids content of 48%, and mixed vigorously for 2 h.

The LOI of the resultant polymer film was 23.2.

Example 4

4.22 g of methyltriethoxysilane and 6.59 g of diethyl n-decanephosphonate were stirred into 15.8 g of the emulsion solution. The resultant emulsion was stirred into 200 g of a crosslinkable vinyl acetate-butyl acrylate dispersion (LT 420 from Wacker-Chemie GmbH) with a solids content of 48%, and mixed vigorously for 2 h.

The LOI of the resultant polymer film was 22.6.

Example 5

8.44 g of Wacker TES-40 (a product of hydrolysis and condensation of tetraethoxysilane with an Si content of 40%) and 5.88 g of DMMP were stirred into 31.6 g of the emulsion solution. The resultant emulsion was stirred into 200 g of a crosslinkable vinyl acetate-butyl acrylate dispersion (LT 420 from Wacker-Chemie GmbH) with a solids content of 48%, and mixed vigorously for 2 h.

The LOI of the resultant polymer film was 22.7.

Example 6 (Comparative Example)

The LOI of a crosslinkable vinyl acetate-butyl acrylate dispersion (LT 420 from Wacker-Chemie GmbH) without addition of silicon- and phosphorus-containing additives was 19.5.

Example 7 (Comparative example)

5.88 g of DMMP were stirred into 31.6 g of the emulsion solution. The resultant emulsion was stirred into 200 g of a crosslinkable vinyl acetate/butyl acrylate (LT 420 from Wacker-Chemie GmbH) with a solids content of 48%, and stirred vigorously for 2 h.

The LOI of the resultant polymer film was 21.5.

What is claimed is:

1. A chlorine-free and antimony-free aqueous dispersion comprising at least one water-insoluble organopolymer, at least one water-dispersible silicon compound, and at least one water-soluble or dispersible phosphorus compound wherein the water-insoluble organopolymer consists of one or more polymers selected from the group consisting of vinyl ester homo- and copolymers containing one or more monomer units selected from the group consisting of the vinyl esters of unbranched and branched alkylcarboxylic acids; (meth)acrylate homopolymers and (meth)acrylate copolymers containing one or more monomer units selected from the group consisting of the methacrylates and acrylates of alcohols; homo- and copolymers of fumaric and maleic mono- and diesters of unbranched and branched alcohols; homo- and copolymers of dienes, and also of olefins, where the dienes are optionally copolymerized with styrene, (meth) acrylates and esters of fumaric and maleic acid; and homo- and copolymers of vinyl aromatics, such as styrene, methylstyrene and vinyltoluene, wherein the water-insoluble organopolymer consists of one or more polymers selected from the group consisting of vinyl ester homo- and copolymers containing one or more monomer units selected from the group consisting of the vinyl esters of unbranched and branched alkylcarboxylic acids; (meth)acrylate homopolymers and (meth)acrylate copolymers containing one or more monomer units selected from the group consisting of the methacrylates and acrylates of alcohols; homo- and copolymers of fumaric and maleic mono- and diesters of unbranched and branched alcohols; homo- and copolymers of dienes, and also of olefins, where the dienes are optionally copolymerized with styrene, (meth)acrylates and esters of fumaric and maleic acid; and homo- and copolymers of vinyl aromatics, such as styrene, methylstyrene and vinyltoluene.

2. A chlorine-free and antimony-free aqueous dispersion comprising at least one water-insoluble organopolymer, and at least one compound which is dispersible or soluble in water and contains both phosphorus and silicon, wherein the water-insoluble organopolymer consists of one or more polymers selected from the group consisting of vinyl ester homo- and copolymers containing one or more monomer units selected from the group consisting of the vinyl esters of unbranched and branched alkylcarboxylic acids; (meth) acrylate homopolymers and (meth)acrylate copolymers containing one or more monomer units selected from the group consisting of the methacrylates and acrylates of alcohols; homo- and copolymers of fumaric and maleic mono- and diesters of unbranched and branched alcohols; homo- and copolymers of dienes, and also of olefins, where the dienes are optionally copolymerized with styrene, (meth)acrylates and esters of fumaric and maleic acid; and homo- and copolymers of vinyl aromatics, such as styrene, methylstyrene and vinyltoluene.

3. An aqueous dispersion as claimed in claim 1, wherein the silicon compounds present are one or more silicon compounds selected from the group consisting of the silicates $Si(OR')_4$; organoorganoxysilanes $SiR_n(OR')_{4-n}$ with n=from 1 to 3; oligosiloxanes of the general formula $R_3SiO(SiR_2O)_nSiR_3$ with n=from 0 to 4, where each R' is an identical or different alkyl radical or alkoxyalkylene radical and R is identical or different and is a branched or unbranched alkyl radical, cycloalkyl radical, alkylene radical, aryl, aralkyl or alkaryl radical, where the radicals R mentioned may also be substituted by ether groups, thioether groups, ester groups, amide groups, nitrile groups, hydroxyl groups, amine groups, carboxyl groups, sulfonic acid groups, carboxylic anhydride groups or carbonyl groups; tetraethoxysilane; methyltri(m)ethoxysilane; methyltripropoxysilane; methyltri(ethoxyethoxy)silane; vinyltri(methoxyethoxy)silane; (meth)acryloxypropyl-triethoxy or -trimethoxysilane; β-nitriloethyl-triethoxysilane; mercaptopropyltriethoxy- or mercaptopropyltrimethoxysilane; phenyltriethoxysilane; isooctyl-triethoxysilane; dipropyldiethoxysilane; methylphenyldiethoxysilane; diphenyldimethoxysilane; methylvinyltri(ethoxyethoxy)silane, and the di- and trisiloxanes of these; hexamethyldiethoxytrisiloxane; octamethylcyclotetrasiloxane; tetramethyldiethoxydisilane; trimethyltrimethoxydisilane; dimethyltetramethoxydisilane; pentamethyldisilanedisiloxane; and their hydrolysis and condensation products.

4. An aqueous dispersion as claimed in claim 1, wherein the phosphorus compounds present are one or more compounds selected from the class consisting of the esters, amides or ester amides of alkyl- or arylphosphonic acids, of phosphoric acid or of pyrophosphoric acid, tetrakis(hydroxyalkyl)phosphonium salts, salts of polyphosphoric acid, ammonium polyphosphate, or triaryl- or trialkylphosphine oxides, diethylmethanephosphonate, dimethyl methanephosphonate, pentaerythritol di(m)ethyldiphosphonate, neopentyl (m)ethylphosphonate, triphenyl phosphate, tricresyl phosphate, resorcinol bis(diphenyl phosphate), pentraerythritol diphenyldiphosphate, neopentyl phenyl phosphate, mono-, di- and triammonium nitrilotrismethylenetriphosphonate, dimethyl 3-[(hydroxymethyl)amino]-3-oxopropylphosphonate, tetrakis(hydroxymethyl)phosphonium chloride, ammonium polyphosphate, tritolylphosphine oxide and triphenylphosphine oxide.

5. The aqueous dispersion of claim 4, wherein said phosphorus compound comprises ammonium polyphosphate.

6. An aqueous dispersion as claimed in claim 2, wherein the compound which is dispersible or soluble in water and contains both phosphorus and silicon is one or more compounds selected from the class consisting of diethyl 2-triethoxysilylethanephosphonate, diethyl 2-trimethoxysilylethanephosphonate, diethyl 3-trimethoxysilylpropanephosphonate, diethyl 2-tri(methoxyethoxy)silylethanephosphonate and 1,3-bis(diethylphosphonoethyl)tetramethyldisiloxane.

7. A process for preparing an aqueous dispersion as claimed in claim 1, which comprises mixing the constituents with one another.

8. The process for preparing an aqueous dispersion as claimed in claim 7, wherein an aqueous polymer dispersion is mixed with the silicon compounds and phosphorus compounds.

9. The process for preparing an aqueous dispersion as claimed in claim 7, wherein an aqueous polymer dispersion is mixed with a solution, emulsion or dispersion of the silicon compounds and with a solution, emulsion or dispersion of the phosphorus compounds.

10. The process for preparing an aqueous dispersion as claimed in claim 9, wherein an aqueous polymer dispersion is mixed with an aqueous solution of the phosphorus compound and an emulsion of the silicon compound.

11. The process for preparing an aqueous dispersion as claimed in claim 7, wherein an aqueous polymer dispersion is mixed with an undiluted phosphorus compound and an emulsion of the silicon compound.

12. A method of preparing a coating composition, comprising coating a substrate with a dispersion as claimed in claim 1.

13. A method of preparing a coating composition, comprising coating a substrate with a dispersion prepared by the process of claim 7.

14. A method for consolidating fibrous materials or pads, comprising adding to said fibrous materials or pads, a composition in accordance with claim 1.

15. A method for consolidating fibrous materials or pads, comprising adding to said fibrous materials or pads, a composition prepared by the process of claim 7.

16. A fibrous material treated with a dispersion as claimed in claim 1.

* * * * *